(12) United States Patent
Gazel Anthoine

(10) Patent No.: US 9,022,283 B2
(45) Date of Patent: May 5, 2015

(54) DEVICE FOR ACTUATING A PORTABLE TERMINAL

(76) Inventor: Laetitia Gazel Anthoine, Paris (FR)

( * ) Notice: Subject to any disclaimer, the term of this patent is extended or adjusted under 35 U.S.C. 154(b) by 20 days.

(21) Appl. No.: 13/978,085

(22) PCT Filed: Jan. 5, 2011

(86) PCT No.: PCT/EP2011/050113
§ 371 (c)(1),
(2), (4) Date: Sep. 17, 2013

(87) PCT Pub. No.: WO2012/092968
PCT Pub. Date: Jul. 12, 2012

(65) Prior Publication Data
US 2014/0001255 A1    Jan. 2, 2014

(51) Int. Cl.
*G06K 7/00* (2006.01)
*G06K 7/01* (2006.01)
*H04M 1/725* (2006.01)

(52) U.S. Cl.
CPC ............... *G06K 7/01* (2013.01); *H04M 1/7253* (2013.01); *H04M 1/72572* (2013.01)

(58) Field of Classification Search
USPC ........................................................ 235/375
See application file for complete search history.

(56) References Cited

U.S. PATENT DOCUMENTS

| 7,072,672 | B1 * | 7/2006 | Vanska et al. ............... 455/456.3 |
| 2006/0138224 | A1 * | 6/2006 | Azami et al. .................. 235/385 |
| 2007/0037614 | A1 * | 2/2007 | Rosenberg ................. 455/575.1 |
| 2008/0057876 | A1 | 3/2008 | Hsia et al. |
| 2010/0099354 | A1 | 4/2010 | Johnson |
| 2014/0242908 | A1 * | 8/2014 | Rosenberg ................... 455/41.1 |

FOREIGN PATENT DOCUMENTS

EP    1 557 961    7/2005

OTHER PUBLICATIONS

International Search Report as issued for PCT/EP2011/050113.

\* cited by examiner

*Primary Examiner* — Christle I Marshall
(74) *Attorney, Agent, or Firm* — Pillsbury Winthrop Shaw Pittman LLP

(57) ABSTRACT

A device enabling a user to actuate a portable terminal using a set of tags having a unique identifier, the device including the set of tags having a unique identifier and the portable terminal for the user, the terminal being capable of sequentially reading unique identifiers among the set of tags. The device further includes a device for identifying the terminal and for actuating the identified terminal depending on a sequence of the unique identifiers read by the terminal.

17 Claims, No Drawings

DEVICE FOR ACTUATING A PORTABLE TERMINAL

CROSS-REFERENCE TO RELATED APPLICATIONS

This is a U.S. National Stage of PCT/EP2011/050113, filed Jan. 5, 2011, the entire contents of this application are incorporated herein by reference in their entireties.

The present invention relates to a device enabling a user to actuate a portable terminal using a set of tags having a unique identifier.

Tags are known in the prior art having a unique identifier consisting for example of one dimensional bar codes or two dimensional chequerboard matrices. Tags of the same type using the technology known as "RFID" or "NFC" also exist. Such tags, when they are capable of being provided with a unique identifier, are used in the prior art linked with a portable terminal, particularly a mobile telephone, provided with a tag reader, to extract therefrom the unique identifier characterising them without ambiguity in a set of tags.

Applications of the technology of tags having a unique identifier are important, particularly when they are used jointly with a database, generally hosted on a server remote from the telephone or hosted in the mobile telephone if its processing power enables it.

In these applications, after reading on a tag of a unique identifier, it is sent to the database, assimilated with the server, together with an identifier of the terminal or telephone, said identifier may be a small file or "cookie"; in return, the database determines an action on the mobile telephone, such as for example the display of a web page by the browser of the telephone or placing the ringtone on standby, as a function of the unique identifier received by the base and the identifier of the telephone, as transmitted to the database.

Nevertheless, in the prior art, the number of choices offered to the user to actuate his terminal by means of tags, either to receive relevant data following the reading of a tag with a mobile telephone, or to receive commands sent to it, is directly linked to the number of tags available for said telephone at a given place.

However, the multiplication of tags in a public place, such as a museum, is impossible or not very desirable, especially for questions of congestion or aesthetics.

For tags situated essentially in a same place, for example for a choice of language by a user, it cannot be easily envisaged to multiply the tags proportionally to the number of languages.

In addition, for tags situated in different places but logically interlinked, according to a visit route, particularly of a museum, the user who wishes to use a visit terminal, capable of reading the tags, is obliged to follow the route of the tags in the planned order, each tag being able to be associated by the database of an application with the position of the next, independently of the identity of the visitor or of the terminal. An inconvenience may ensue for visitors who follow each other in single file without being able to organise their visit as they like, in any or in a personal order.

It is not in fact known to update and to personalise the information delivered to a visitor as a function of the history or sequence over time of the movements of the visitor represented by the history of the separate tags read by a same terminal over time or the number of times that a same terminal has read a same tag, to indicate in particular a choice between different languages, as in a menu.

The prior art thus uniquely knows for systems including a portable terminal, a database and a set of tags having a unique identifier which can be read by the terminal to deliver to it the information of the database, the delivery to the terminal of non-updated or non-personalised information as a function of the history of the connections of the terminal to the database, of the terminal, or time sequence or sequence, of tags already read by the terminal.

In this context the invention is thus a device enabling a user to actuate a portable terminal using a set of tags having a unique identifier, including a set of tags having a unique identifier, a terminal that can be carried by a user, the terminal being capable of sequentially reading, among the set of tags, unique identifiers, and which comprises means for identifying the terminal and actuating the identified terminal, as a function of a sequence of unique identifiers read by the terminal.

In particular embodiments of the invention:
  the said means include a database, linked with the terminal, capable of identifying the terminal and actuating the identified terminal, as a function of said sequence.
  said sequence of unique identifiers consists of a repetition of the unique identifier of a same tag.
  said sequence of unique identifiers consists of a sequencing of the unique identifiers of at least two tags.
  the means capable of identifying the terminal and actuating the identified terminal include means of sending commands to said terminal.
  the means capable of identifying the terminal and actuating the identified terminal include means of sending data to said terminal.
  the means of sending commands to said terminal include means of sending a command to inhibit or authorise a sound signal of the terminal.
  the means of sending data to said terminal include means of sending data to an internet browser of the terminal.

The invention also relates to a method enabling a user to actuate a portable terminal using a set of tags having a unique identifier and a database, including the steps of reading in sequence, among the set of tags, unique identifiers, by the terminal, sending in sequence, to the database, the unique identifiers read, receiving in sequence, in the database, the unique identifiers sent, identifying the terminal, in the database, and including a step of actuating the identified terminal, by the database, as a function of a sequence of unique identifiers received.

The invention also relates to an application of this method of creating a personalised route, for a visitor using said portable terminal, in a place of visit equipped with stations provided with tags having a unique identifier of said set and for a calculator hosting said database, wherein the calculator sends to the terminal, on reading a tag of any station of the place of visit, a list of the stations of said place, without mentioning the stations of which the tags have already been read, in sequence, by the terminal used by the visitor.

According to the present invention, a sequence of unique identifiers is a set of at least two unique identifiers having been read at different times by said terminal; a database is a data management system, which can be hosted on a calculator, which can be a server computer remote from said terminal, or a computer local to said terminal, or which can be divided between a remote server and computer local to said terminal, said database, being able to comprise means of memorising the sequence of unique identifiers received and dating over time the identifiers read by said identified terminal, particularly in a table associated with said terminal, and being able to comprise calculation means making it possible to exploit the information on the sequence and on the identity of the terminal to determine as a result an action to have carried out at the terminal; a place of visit is any place open to the public or to visitors, such as a monument, a museum, a commercial centre or a town.

DESCRIPTION OF THE INVENTION

The invention may be realised in two first embodiments distinguished by the number of tags read by the terminal, particularly a first embodiment wherein the terminal reads a single tag and a second embodiment wherein it reads at least two thereof.

The invention is described for these two embodiments within the context of a museum in which a user of a portable terminal wishes to follow a route punctuated with stations, each provided with at least one tag having a unique identifier, while attaining each station a single time.

The invention then comprises the portable terminal, a set of tags on which the terminal may be used to read a unique identifier, defining without ambiguity the tag read, among the set of tags to be read and a database hosted on a server or on the terminal if it is provided with sufficient calculation means. A link is established between the database and the terminal, which enables the database to identify the terminal, either because an identifier of the terminal or number of the terminal is transmitted to the base at the same time as the unique identifier of each tag, or because the database is capable, in an equivalent manner, on the basis of the information previously received over time via the link, of deducing without ambiguity that it is the same terminal that has carried out the reading of the tag. This situation is resumed by the fact that the database is provided with means of identifying the terminal having read the unique identifier.

Moreover, the database can associate with each unique identifier of tag associated with a terminal number, an absolute time of reading of the identifier and number pairing, for example using a clock to which the database has access to know this absolute time. This characteristic is moreover assumed common to all the embodiments of the invention. This situation is resumed by the fact that the database is provided with means for memorising the time sequence of the unique identifiers read by a same terminal. This memory may be limited to a given number of identifiers or to a limited depth in the past, as a function of the type of use of said time sequence.

At the start of the visit, no information on the history of the readings of the stations by the terminal is archived in the database. The time sequence of the identifiers of the terminal is thus empty. The database may be programmed to accept any terminal number or a finite list of terminals identified by their numbers, for security purposes or to avoid frauds, if access to the terminal is charged.

The first station is then a station of choice of language by the user of said station. It is representative of a service accessible at any time by the user.

To this end, the user reads the tag of the language choice station using the terminal and the database receives a set of data corresponding to the unique language choice identifier, the number of the terminal and allocates it a time by its clock or optionally by that of the terminal if the terminal also transmits the absolute time of reading by the link, to the database.

The database then archives, in a table dedicated to the identified terminal, the identifier and the time or the absolute time of the reading. It then actuates the terminal, for example by display on its screen of a language list, using an internet browser or a dedicated application.

The user may then choose between a list of display languages by repeating the reading of the language choice tag, until the desired language is obtained. To this end, the database chooses a content to display, which is a function of the history of the readings of the language choice tag or their time sequence, by counting the repetition of the reading of this tag in the table of the terminal and by displaying the language of which the number is equal to the sum of the number of readings of this same tag, modulo the total number of languages.

At any moment of his visit, the visitor can return to this station to change language and display the following language in the list of languages available on his terminal. Service stations enabling a choice in any menu can be made available to the user by calculation of the repetition or the sum of the occurrences of the reading of a same service tag in the table of a same terminal. For such a menu, the time sequence is a repetition that concerns a single tag.

For the remainder of his visit in the museum, the user of the terminal can choose, thanks to the invention, to go through the set of stations in the order that he wishes, by simple reading using the terminal of the stations that he attains in sequence. To this end, the time sequence of the unique identifiers of the tags of the stations that he attains is archived in the database in the table dedicated to the terminal and a list of the stations remaining to be attained in his route is displayed, while only selecting the stations for which identifiers are not present in the table of the terminal and sending them to the terminal for display. In this case, the time sequence is a sequencing that concerns at least two separate tags. In this sequencing over time concerning at least two tags, the repetition of a same tag may however be envisaged, the visitor being able to decide, for example, to attain several times the same station.

The relevance of the information delivered to the user of a same terminal is thus improved by the invention, during his visit of the museum, understood in the sense of any place open to the public. It is particularly possible to only display on a screen of small size, having few lines or even a single line, the first stations not attained by the user without obliging him to scroll through the list of all the stations to visit in the museum. The ergonomics of the terminal is thereby improved for the user.

This result is obtained by the main characteristic of the invention which is to actuate a portable terminal as a function of the time sequence of the unique identifiers of tags read by said terminal.

The invention may also be applied to the creation of an automatic system for disabling the ringtone of mobile telephones when a user enters a movie theatre and re-enabling the ringtone or sound signal of the telephone on leaving the movie theatre.

In this embodiment, the user can use his portable terminal to read a theatre tag having a unique identifier at his entry and at his exit from the movie theatre. The database may then at each reading of an identified terminal have available an identifier that it uses to actuate the portable terminal by sending it a switch over command between a sound mode where it emits a sound signal at each call received and a vibrator or silent mode. For the first reading, associated with a terminal, the command of the invention is a passage into vibration mode, for the second reading a passage into sound mode. It is possible to envisage that the time sequence is of a depth reduced to a single identifier, a switch over only requiring this depth in the manner of a swapping. The invention may thus be used to send not just data but also commands to a portable terminal, to manage its ringtone or other functionality, its internet browser or any other application and generally speaking to actuate it by means of the reading of a set of tags having a unique identifier.

In another application example, the repetition of the reading of a tag by an identified terminal can bring about initially the downloading of an application then its opening by the terminal for the following readings.

In another application example, the invention may be used, for a tag arranged on a building, to parameterise, by menu, a communication network of the terminal such as the Wi-Fi network.

In another application example, the tag being arranged on a product, the reading by a same terminal may make it possible to choose, by menu, between the price and the characteristics of the product, then after purchase the display of information for use or after sales service and after the end of the guarantee, an additional display of new similar products.

In another application example, the tag being arranged on a product, the reading by a same terminal may make it possible to choose, by menu, between the display of information on the product at its entry into a warehouse, then at a second reading, a display of form adapted to the departure of the product from the warehouse, then the display of information adapted to the product taken delivery of by the final client.

It should be noted that according to the present invention, for a terminal reading sequentially unique identifiers of a set of tags, a repetition is a time series of unique identifiers of a same tag and a sequencing is a time series of unique identifiers of at least two tags, with or without repetition over time of unique identifiers of a same tag, within the series. From this point of view, a sequence may also be defined as a sub-series of a time series of unique identifiers of a set of tags read by said terminal, the sub-series constituting an extract of the history of the identifiers of the tags read by the terminal. The invention may thus also be seen, in a more general manner, as an example of means of actuating an identifiable terminal, as a function of the history of its readings of tags having a unique identifier.

The invention is open to industrial application in the realisation of ergonomic portable terminals and mobile telephony.

The invention claimed is:

1. A system enabling a user to actuate a portable terminal using a set of tags having a unique identifier, the system comprising: a set of tags each having a unique identifier, a portable terminal that is transportable by a user, the portable terminal being configured to sequentially read, among the set of tags, unique identifiers and a database hosted on a server computer that is remote from said portable terminal and linked with the portable terminal, the database configured to identify the portable terminal, wherein the database is configured to actuate the identified portable terminal as a function of the number of times that said portable terminal has read a same tag among said set of tags.

2. The system according to claim 1, wherein the database is configured to actuate the identified portable terminal by sending commands to said portable terminal.

3. The system according to claim 2, wherein said commands are a command to inhibit or authorise a sound signal of the portable terminal.

4. The system according to claim 1, wherein the database is configured to actuate the identified terminal by sending data to said portable terminal.

5. The system according to claim 4, wherein said data are sent to an internet browser of the portable terminal.

6. Method for implementing the device according to claim 1, including reading in sequence, among the set of tags, unique identifiers, by the portable terminal, sending in sequence, to the database, the unique identifiers read, receiving in sequence, in the database, the unique identifiers sent, identifying the portable terminal, in the database, and actuating the identified portable terminal, by the database, as a function of the sequence of unique identifiers received.

7. A method comprising creating a personalised route with the method of claim 6, for a visitor using said portable terminal, in a place of visit equipped with stations provided with tags having a unique identifier of said set, the visitor wishing to reach once each station in any order, in which the database sends to the terminal, at the reading of a tag of any station of the place of visit, a list of the stations of said place, without mentioning the stations of which the tags have already been read, in sequence, by the terminal used by the visitor.

8. The system according to claim 1, wherein the set of tags are located in a museum, a monument, a commercial center or a town.

9. The system according to claim 1, wherein the database is adapted to actuate the identified portable terminal by selecting a particular content for display by the portable terminal based on the number of times that said portable user terminal has consecutively read said same tag among said set of tags.

10. The system according to claim 9, wherein said particular content is a language.

11. A system enabling a user to actuate a portable terminal using a set of tags having a unique identifier, the portable terminal to be carried by a user, the system comprising: a set of tags having a unique identifier, the portable terminal configured to sequentially read, among the set of tags, unique identifiers, and a database hosted on a server computer that is remote from said portable terminal and linked with the portable terminal, the database configured to identify the portable terminal, wherein the database is configured to actuate the identified portable terminal as a function of the number of times that said portable terminal has consecutively read a same tag among said set of tags.

12. The system according to claim 11, wherein the set of tags are located in a museum, a monument, a commercial center or a town.

13. The system according to claim 11, wherein the database is adapted to actuate the identified portable terminal by selecting a particular content for display by the portable terminal based on the number of times that said portable user terminal has consecutively read said same tag among said set of tags.

14. The system according to claim 13, wherein said particular content is a language.

15. A system for actuating a portable user terminal, the system comprising:
   a set of physical tags positioned at different locations and each having a unique identifier, the portable user terminal adapted to read the unique identifiers of the set of physical tags, and
   a database hosted on a server computer that is remote from said portable user terminal and linked with the portable user terminal, the database configured to identify the portable user terminal and to actuate the identified portable user terminal, wherein the database is adapted to select a particular content for display by the portable user terminal as a function of the number of times that said portable user terminal has consecutively read a same physical tag among said set of physical tags.

16. The system according to claim 15, wherein said particular content is a language.

17. The system according to claim 15, wherein the set of physical tags are located in a museum, a monument, a commercial center or a town.

* * * * *